United States Patent
Huang

(10) Patent No.: US 7,672,330 B2
(45) Date of Patent: Mar. 2, 2010

(54) METHODS FOR SENDING AND RECEIVING NETWORK MANAGEMENT MESSAGES AND/OR CONTROL MESSAGES

(75) Inventor: Feng Huang, Shanghai (CN)

(73) Assignee: Alcatel, Paris (FR)

( * ) Notice: Subject to any disclaimer, the term of this patent is extended or adjusted under 35 U.S.C. 154(b) by 1003 days.

(21) Appl. No.: 11/295,612

(22) Filed: Dec. 7, 2005

(65) Prior Publication Data

US 2006/0126662 A1 Jun. 15, 2006

(30) Foreign Application Priority Data

Dec. 9, 2004 (CN) .................... 2004 1 0089327

(51) Int. Cl.
*H04J 3/16* (2006.01)
(52) U.S. Cl. ............... 370/466; 370/465; 370/474; 370/401; 370/389; 370/392; 370/907; 398/43; 398/45; 398/46
(58) Field of Classification Search ............... 370/389, 370/392, 395.51, 471, 474, 465, 466, 401, 370/907; 398/43, 45, 46
See application file for complete search history.

(56) References Cited

U.S. PATENT DOCUMENTS

| | | | | |
|---|---|---|---|---|
| 6,856,620 B1 * | 2/2005 | Dunsmore et al. | .......... | 370/389 |
| 7,164,860 B1 * | 1/2007 | Narvaez et al. | ............... | 398/58 |
| 7,187,650 B2 * | 3/2007 | Xiong et al. | ................ | 370/235 |
| 2003/0218981 A1 * | 11/2003 | Scholten | ...................... | 370/235 |
| 2005/0053064 A1 * | 3/2005 | Wang | .......................... | 370/389 |
| 2005/0169275 A1 * | 8/2005 | Jiang et al. | .................. | 370/392 |
| 2006/0209840 A1 * | 9/2006 | Paatela et al. | ............. | 370/395.7 |
| 2006/0268943 A1 * | 11/2006 | DeCusatis et al. | ........... | 370/539 |
| 2007/0127526 A1 * | 6/2007 | Xiong et al. | ................ | 370/474 |

* cited by examiner

*Primary Examiner*—Aung S Moe
*Assistant Examiner*—Christopher P Grey
(74) *Attorney, Agent, or Firm*—Carmen Patti Law Group, LLC

(57) ABSTRACT

The present invention provides a method for sending and receiving the network management messages and/or the control messages, that is, using GFP protocol in stead of conventional LAPD protocol, predetermining the mapping relationship between the values of UPI field in GFP protocol and the types of the data including the network management messages and/or the control messages, furthermore, filling the UPI field of GFP protocol based on the corresponding mapping relationship, encapsulating the network management messages and/or the control messages via GFP protocol into SDH/SONET, PDH or OTN, and transmitting the encapsulated data. GFP protocol is a universal protocol, allowing for inter-operation of the network management messages and the control messages between the equipments of different manufacturers.

12 Claims, 4 Drawing Sheets

METHODS FOR SENDING AND RECEIVING NETWORK MANAGEMENT MESSAGES AND/OR CONTROL MESSAGES

FIELD OF THE INVENTION

The present invention relates to methods for sending and receiving network management messages and/or control messages, more particularly, to a method for sending and receiving network management messages and/or control messages between equipments of different manufacturers in Synchronous Digital Hierarchy (SDH), Synchronous Optical Network (SONET), Optical Transmission Network (OTN) and Plesiochronous Digital Hierarchy (PDH) networks.

CROSS REFERENCE TO RELATED APPLICATION

This application claims priority of Chinese Application No.: 200410089327.7 filed on Dec. 9, 2004, the subject matter of which is incorporated herein by reference in its entirety.

BACKGROUND OF THE INVENTION

With quick development of Data Service, Data Network tends to be integrated with conventional Time Division Multiplexing (TDM) Network. Multi-Service Transport Platform (MSTP) equipments are the key equipments for network integration, and these kinds of equipments have gone through three generations: Ethernet transparent transmission, Ethernet Layer 2 (L2) Switch and embedded Multiple Protocol Label Switch (MPLS) and Resilient Packet Ring (RPR). For the sake of inter-operation of these MSTP equipments, it is necessary to realize inter-operation of the data, the network management messages and the control messages transmitted by MSTP.

Generally, in SDH network, Generic Framing Procedure (GFP) Protocol is used to encapsulate the data transferring messages, such as Ethernet messages, etc. However, the network management messages and the control messages are transmitted in SDH network by encapsulating these messages into SDH DCC (D1-D12) bytes. As for the network management messages based on Open System Interconnection (OSI), they are usually encapsulated into SDH DCC via LAPD (the control protocol of Data Link Layer As for the network management messages or the control messages based on IP (Internet Protocol), they can be encapsulated into SDH DCC via LAPD, or the IP signals can be encapsulated into Ethernet, and then transmitted out of band, or the IP signals that have been encapsulated into Ethernet can be encapsulated into SDH DCC via LAPS (Link Access Protocols or GFP and like and then transmitted in band.

Like DCC in SDH network, overhead in the OTN network are used otherwise, payload in PDH network is used.

When LAPD is used to transmit the network management messages or the control messages, the working process is as follows: at a source, when upper layer data arrive, the specific beginning characters as flags are added to them, then whether the same characters as the specific characters acting as flags exist in the data is judged, if yes, the specific characters are transformed, and then the data are transmitted after the filling bytes are added and FCS (Frame Check Sequence) is performed. At a sink, the specific characters are judged, the beginning of the frame is determined, the messages are received, then the specific characters in the data are inverse-transformed, the filling bytes are removed, and the messages are received and sent to upper layer for further processing.

If LAPD is used, since specific characters are used as flags, it is necessary to fill characters and to process the specific characters appeared in the encapsulated data, which results in that, however, it is impossible to realize inter-operation of the network management messages and the control messages between the equipments of different manufacturers. Moreover, since specific frame delimiting bytes are needed in LAPD, it is necessary to perform the processing of filling redundant codes, which makes the processing complicated. Additionally, LAPD only supports the Point-to-Point topology, but does not support other topology.

On the other hand, if the IP signals are encapsulated into Ethernet and then transmitted out of band, or the IP signals encapsulated in the Ethernet are encapsulated into SDH DCC via the protocol such as LAPS or GFP and then transmitted in band, one more time of the encapsulating processing is needed, which makes the processing complicated.

In view of the above fact, the object of the present invention is to provide a simple method for sending and receiving the network management messages and/or the control messages between the equipments of different manufacturers in Synchronous Digital Hierarchy (SDH) network, Synchronous Optical Network (SONET), Optical Transmission Network (OTN) and Plesiochronous Digital Hierarchy (PDH) networks.

SUMMARY OF THE INVENTION

This method takes advantage of a universal encapsulating protocol to realize inter-operation between the equipments of different manufactures. The present invention provides a method for sending the network management messages and/or the control messages, comprising the following steps:

1) when network layer data arriving, a source judging the types of data;

2) based on the predetermined mapping relationship between the values of UPI field in GFP and the types of the data including the network management messages and/or the control messages, the source filling UPI field and performing GFP encapsulating;

3) the source performing physical layer processing to the data having been GFP encapsulated;

4) the source sending the data having been physical layer processed to a sink.

The present invention also provides a method for receiving the network management messages and/or the control messages, comprising the following steps:

1) a sink receiving the data sent from a source;

2) the sink performing physical layer inverse-processing to the data received;

3) the sink performing GFP un-encapsulating to the data having been physical layer inverse-processed and reading out UPI field in GFP protocol;

4) based on the predetermined mapping relationship between the values of UPI field and the types of the data including the network management messages and/or the control messages, the sink identifying the types of the data corresponding to the values of UPI field and performing corresponding processing to the different types of the data.

The methods according to the present invention can be used in Synchronous Digital Hierarchy (SDH) network, Synchronous Optical Network (SONET), Optical Transmission Network (OTN) and Plesiochronous Digital Hierarchy (PDH) networks.

Since the present invention uses GFP protocol instead of LAPD to encapsulate the network management messages and/or the control messages, the following advantages can be obtained:

1) frame delimiting of GFP protocol is based on PLI in Payload Header and cyclic redundancy check is used, which is more effective and simpler than frame delimiting by specific characters;

2) the extended frame header of GFP can be applicable to various topologies, such as loop and point-to-point, which overcomes the defects of LAPD applicable to point-to-point structure only;

3) GFP protocol has its own FCS field, which can ensure the integrity of the transmitted data and is very effective for protecting the payload having no FCS field on its own;

4) in LAPD, since every byte needs to be checked, if some bytes are same as flag characters, some processing for these bytes needs to be performed, making the payload longer; however, the frame delimiting manner of GFP protocol is based on PLI in Payload Header, so the transmitting performance is independent of the content being transmitted.

DETAILED DESCRIPTION OF THE PREFERRED EMBODIMENT

Figure 1:
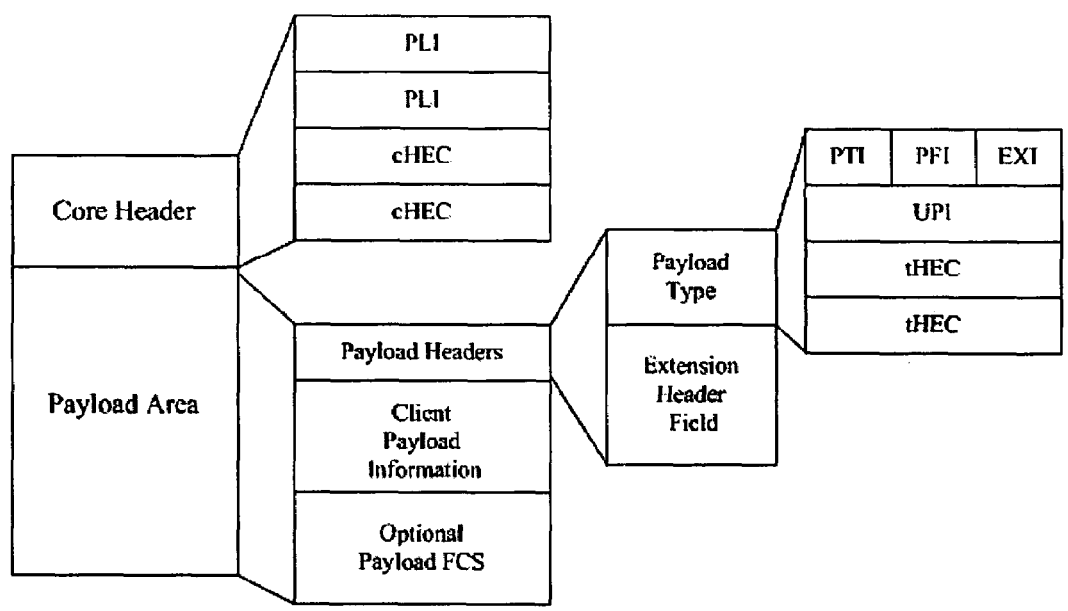
FIG. 1 is a schematic structural diagram of the structure of GFP Frame.

In the following description, the technical scheme of the present invention will be described in detail with reference to an embodiment and accompanying drawings. We hereby take SDH/SONET network as example. Firstly, the structure of GFP Frame will be described. FIG. 1 is a schematic structural diagram of the structure of GFP Frame. GFP Frame consists of Core Header and Payload Area, as shown in FIG. 1, wherein the length of core header is 4-byte, each of PLI (PDU Length Indicator) and cHEC (core header error control) occupies two bytes individually, cHEC being a 16-bit error control symbol for cyclic checking. Payload Area is divided into Payload Header, Client Payload Information and Optional Payload FCS, wherein Payload Header is divided into Payload Type and Extension Header Field. Payload Type functions mainly to provide the types and formats of Client Payload Information, to distinguish various types of GFP Frame so as to distinguish various services in a multi-service circumstance. Extension Header Field functions mainly to support various topologies. Optional Payload FCS is for ensuring the integrality of the payload transmitted.

The present invention uses GFP instead of LAPD to encapsulate the network management messages and/or the control messages, taking advantage of GFP's merits to realize interoperation of the network management messages and the control messages between the equipments of different manufacturers. GFP is an existent protocol, but is limited to encapsulating data messages in the prior arts. If GFP is used to encapsulate the network management messages and/or the control messages, GFP protocol needs to be extended. As shown in FIG. 1, Payload Type of GFP protocol is made of 4 bytes, wherein each of PTI (Payload Type Indicator)+PFI (Payload FCS Indicator)+EXI (Extension Header Indicator) and UPI (User Payload Indicator) occupies one byte individually, tHEC (type header error control) occupies two bytes. UPI is used to indicate the type of Client Payload. The key principle of the present invention lies in extending GFP by defining some formerly undefined values of UPI bytes to indicate the network management messages and the control messages. The following Table 1 shows an example of UPI extension:

TABLE 1

| PTI = 000 | |
|---|---|
| UPI:Type bits <7:0> | GFP frame Payload Area |
| 0000 0000 1111 1111 | Reserved and not available |
| 0000 0001 | Frame-Mapped Ethernet |
| 0000 0010 | Frame-Mapped HDLC/PPP |
| 0000 0011 | Transparent Fibre Channel |
| 0000 0100 | Transparent FICON |
| 0000 0101 | Transparent ESCON |
| 0000 0110 | Transparent Gb Ethernet |
| 0000 0111 | Reserved for future |
| 0000 1000 | Frame-Mapped Multiple Access Protocol over SDH (MAPOS) |
| 0000 1001 | Transparent DVB ASI |
| 0000 1010 | Framed-Mapped IEEE 802.17 Resilient Packet Ring |
| 0000 1011 | Frame-Mapped Fibre Channel FC-BBW |
| 0000 1100 | Asynchronous Transparent Fibre Channel |
| 0000 1101 | Frame-Mapped MPLS (Unicast) |
| 0000 1110 | Frame-Mapped MPLS (Multicast) |
| 0000 1111 | Frame-Mapped OSI (CNLP) (Network Management Messages) |
| 0001 0000 | Frame-Mapped IPv4 (MPLS Control Signal Messages) |
| 0001 0001 | Frame-Mapped IPv6 (MPLS Control Signal Messages) |
| 0001 0010 to 1110 1111 | Reserved for future standardization |
| 1111 0000 to 1111 1110 | Reserved for proprietary use | wherein three values of 00001111, 00010000 and 00010001 are newly defined in this example to indicate the network management messages and the control messages respectively.

With the definition of table 1, GFP protocol can be used to encapsulate the network management messages and the control messages, thereby the scheme of the present invention, that is, the method for sending and receiving the network management messages and/or control messages between the equipments of different manufacturers in Synchronous Digital Hierarchy (SDH) network, Synchronous Optical Network (SONET), Optical Transmission Network (OTN) and Plesiochronous Digital Hierarchy (PDH) networks can be realized.

Figure 2:
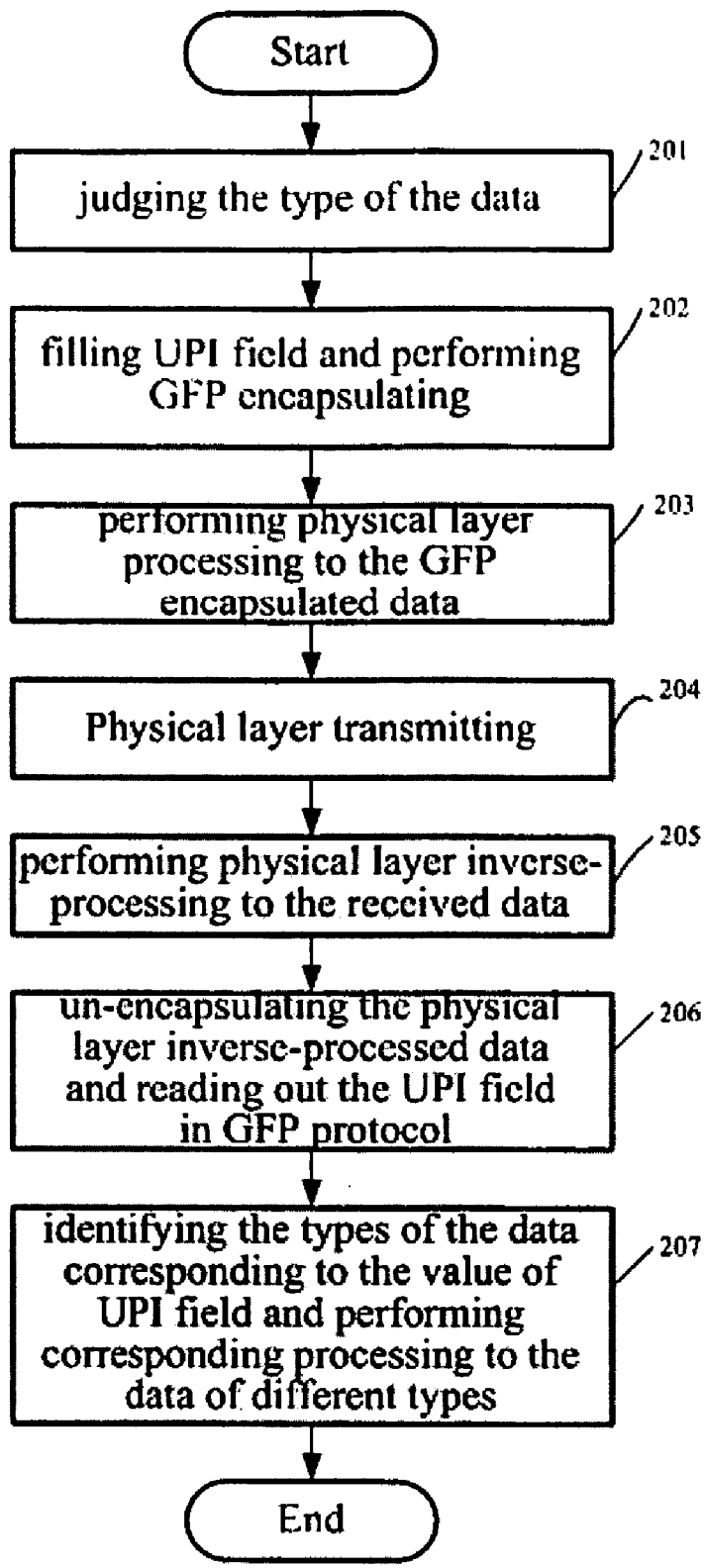
FIG. 2 is a flow chart of the methods for sending and receiving network management messages and/or control messages according to the present invention.
Figure 3:
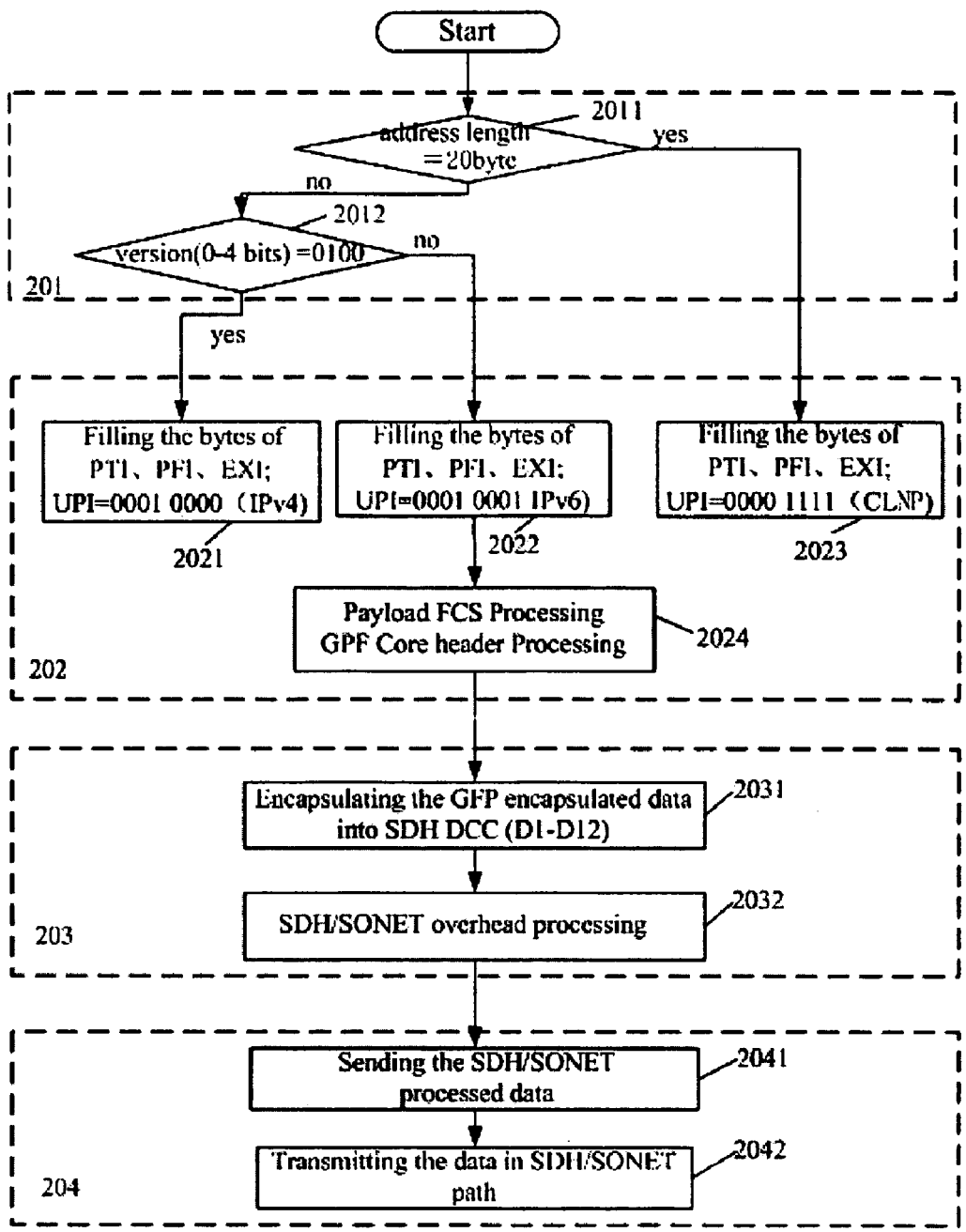
FIG. 3 is a flow chart of the method for sending network management messages and/or control messages according to an embodiment of the present invention.
Figure 4:
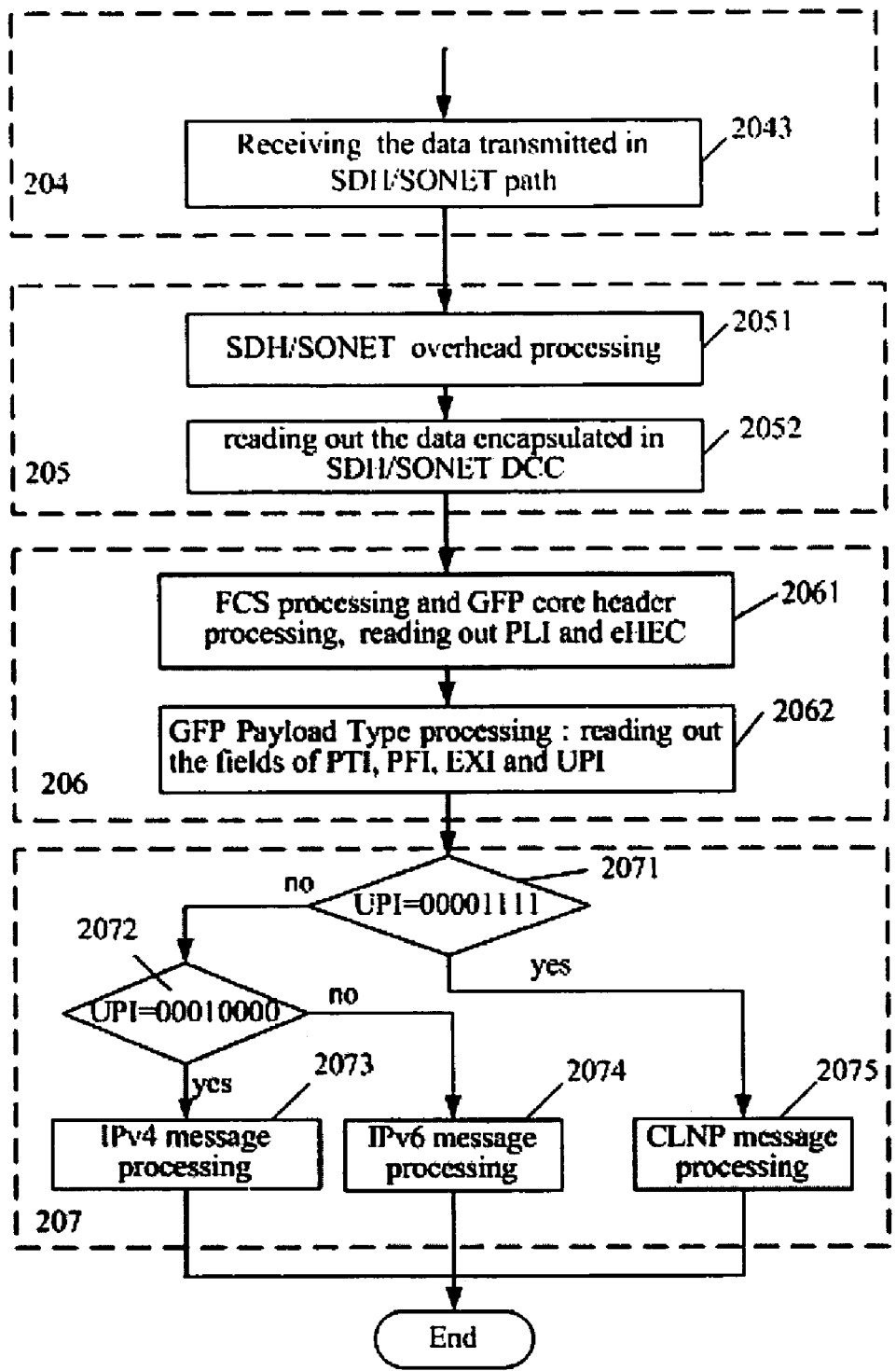
FIG. 4 is a flow chart of the method for receiving network management messages and/or control messages according to an embodiment of the present invention.

Next, the procedure of the methods of the present invention will be described in detail with reference to FIG. 2, FIG. 3 and FIG. 4. FIG. 2 is a flow chart of the method for sending and receiving network management messages and/or control messages according to the present invention. FIG. 3 is a flow chart of the method for sending network management messages and/or control messages according to this embodiment. And FIG. 4 is a flow chart of the method for receiving network management messages and/or control messages according to this embodiment.

As shown in FIG. 2, when data of network layer arrive, the source judges the type of the data (step 201). As shown in FIG.

3, in this embodiment, step 201 is divided into steps 2011 and 2012. It is supposed that, in this embodiment, the control messages transmitted are IPv6 messages and Ipv4 messages, and the network management messages are Connectionless Network Protocol (CLNP) messages. First, the source judges whether the address length is 20 bytes (step 2011). Since the address length of CLNP messages is 20 bytes, while the address length of Ipv6 is 16 bytes and that of Ipv4 is 4 bytes, if the judging result of step 2011 is "yes", it means that the message is a CLNP message. If the judging result of step 2011 is "no", then the source further judges whether the first 4 bits of header field of the message is "0100" (step 2012). The first 4 bits of header field of Ipv4 message (that is, version number) is "0100", while the first 4 bits of header field of Ipv6 message (that is, version number) is "0110", therefore, if the judging result of step 2012 is "yes", it means that the message is an Ipv4 message, if the judging result of step 2012 is "no", it means that the message is an Ipv6 message.

Then, based on the predetermined mapping relationship between the values of UPI field in GFP Protocol and the types of the data, that is, the mapping relationship defined in table 1 in this embodiment, the source fills UPI field and performs GFP encapsulating (step 202) in FIG. 2. In this embodiment, as can be seen in FIG. 3, step 202 is divided into steps 2021, 2022, 2023 and 2024. After being judged in step 201, if the message is an Ipv4 message, then UPI=00010000 according to table 1, and other bytes in GFP Payload Type, such as PTI, PFI, EXI, etc., are also filled with corresponding values (step 2021); if the message is an Ipv6 message, then UPI=00010001 according to table 1, and other bytes in GFP Payload Type are also filled with corresponding values (step 2022); if the message is a CLNP message, then UPI=00001111 according to table 1, and other bytes in GFP Payload Type are also filled with corresponding values (step 2023). Then, FCS processing and GFP core header processing are performed, that is, PLI and cHEC are filled (step 2024).

Next, the source performs physical layer processing to the GFP encapsulated data (step 203) in FIG. 2. In this embodiment, this step is divided into steps 2031 and 2032, as can be seen from FIG. 3. In this embodiment, the source performs SDH/SONET processing. First, the source encapsulates the GFP encapsulated data into SDC/SONET DCC, that is, D1-D12 bytes (step 2031), then the SDH/SONET overhead processing is performed (step 2032).

Then, the source sends the processed data to the sink, and the sink receives the data sent from the source (step 204) in FIG. 2. In this embodiment, this step is divided into steps 2041, 2042 and 2043, as can be seen from FIG. 3 and FIG. 4. The source sends the SDH/SONET processed data (step 2041), the data are transmitted in SDH/SONET path. (step 2042), and the sink receives the data (step 2043).

After receiving the data, the sink performs physical layer inverse-processing to the received data (step 205) in FIG. 2. In this embodiment, this step is divided into steps 2051 and 2052, as can be seen from FIG. 4. First, the sink performs the overhead processing (step 2051), then it reads out the data encapsulated in SDH/SONET DCC, that is, D1-D12 bytes (step 2052).

Then, the sink GFP un-encapsulates the physical layer inverse-processed data and reads out the UPI field in GFP protocol (step 206) in FIG. 2. In this embodiment, this step is divided into steps 2061 and 2062 in FIG. 4. First, the sink performs FCS processing and GFP core header processing, that is, reading out PLI and eHEC (step 2061), after that, the sink performs GFP Payload Type processing and reads out the fields of PTI, PFI, EXI and UPI (step 2062).

Finally, based on the predetermined mapping relationship between the values of UPI field and the types of the data, that is, the corresponding relationship defined in table 1 in this embodiment, the sink identifies the types of the data corresponding to the value of UPI field and performs corresponding processing to the data of different types (step 207) in FIG. 2. In this embodiment, this step is divided into steps 2071, 2072, 2073, 2074 and 2075 in FIG. 4. First, the sink judges whether the value of UPI is "00001111" (step 2071). As shown in table 1, the value of UPI corresponding to CLNP messages is "00001111", so that if the judging result of step 2071 is "yes", the sink performs CLNP message processing (step 2075); and if the judging result of step 2071 is "no", the sink further judges whether the value of UPI is "00010000" (step 2072). As shown in table 1, the value of UPI corresponding to Ipv4 messages is "00010000", so that if the judging result of step 2072 is "yes", the sink performs Ipv4 message processing (step 2073), and if the judging result of step 2072 is "no", the sink performs Ipv6 message processing (step 2074).

As can be seen from the above analysis, with the scheme of the present invention, the network management messages and the control messages are encapsulated via GFP protocol by defining some formerly undefined values of UPI field in GFP protocol to indicate the network management messages and the control messages. Since GFP protocol is a universal protocol, by using cyclic redundancy check based on PLI of Payload Header to realizing frame delimiting, which is similar with ATM technical, rather than using specific characters as done in LAPD, inter-operation of the network management messages and the control messages between the equipments of different manufacturers can be realized. This kind of frame delimiting manner can reduce the overhead of delimiting bytes, and the transmitting performance is independent of the content being transmitted, avoiding the influence of the content being transmitted on the transmitting performance. Other merits of GFP protocol are as follows: the extended frame header of GFP can be applicable to various topologies, which overcomes the defects of LAPD able to support the point-to-point structure only; GFP protocol has its own FCS field, which can ensure the integrity of the transmitted data and is very effective for protecting the payload having no FCS field on its own.

While the preferred embodiment of the present invention is described above in detail, this description is not intended to limit the invention, it will be apparent to those skilled in the art that various changes and modifications can be made in the scope of the invention defined by the appending claims.

The invention claimed is:

1. A method for sending network management messages and control messages in a general framing procedure (GFP) frame, comprising the following steps:
   1) when network layer data arrives at a source, the source determines a type of the network layer data where determining the type of the network layer data further comprises determining if the type of the network layer data comprises at least one of a IPv4, IPv6 and connectionless protocol (CLNP) message;
   2) the source fills a UPI field and performs GFP encapsulating where the source fills the UPI field of the GFP frame based on the type of the network layer data and where GFP encapsulating comprises encapsulating the GFP frame with at least one of a IPv4 message, a IPv6 message and a CLNP message, wherein:
      a) if an address length of the received network layer data is set to 20, the source sets the UPI to 0001111 to indicate the GFP frame comprises a CLNP message and encapsulates the GFP frame with the CLNP message;

b) if the address length is not set to 20 and a first 4 bits of a header field comprising the received network layer data is set to "0100", the source sets the UPI field to "00010000" to indicate that the GFP frame comprises an IPv4 message and encapsulates the GFP frame with the IPv4 message; and c) the source sets the UPI filed to 00010001 to indicate that the GFP frame comprises an IPv6 message and the source encapsulates the GFP frame with the IPv6 message, if the address length is not set to 20 and a first 4 bits of the header field comprising the received network layer data is set to "0110", 3) the source performs physical layer processing on the GFP frame;

4) the source sends the GFP frame to a sink.

2. The method according to claim 1, wherein the physical layer processing comprises at least one of Synchronous Digital Hierarchy (SDH), Synchronous Optical Network (SONET), Optical Transmission Network (OTN) and Plesiochronous Digital Hierarchy (PDH) physical network layer processing; and where the encapsulated GFP frame is sent on at least one of a SDH network, a SONET network, an OTN network and a PDH network.

3. The method according to claim 1, wherein the type of network layer data comprises at least one of a network management message type and control message type where the network management message type comprises a CLNP type and the control message type comprises at least one of an IPv4 and an IPv6 message type.

4. The method according to claim 1, wherein said network management messages comprise CLNP messages.

5. The method according to claim 1, wherein said control messages comprise at least one of an IPv4 message and an IPv6 messages.

6. A method for sending and receiving network management messages and control messages, comprising the following steps:

1) when network layer data arrives at a source, the source determines a type of data of the network layer data;

2) formatting a GFP frame where formatting a GFP frame comprises setting a UPI field to a predetermined value that is mapped to the data type of the network layer data where the UPI field comprises a field of the GFP frame and encapsulating the GFP frame based on the type of the network layer data with at least one of an IPv4 message, IPv6 message and CLNP message, wherein a) the source sets UPI field to 0001111 to indicate the GFP frame comprises a CLNP message and the source encapsulates the GFP frame with the CLNP message, if an address length comprising the network layer data is set to 20;

b) the source sets the UPI field to 00010000 to indicate that the GFP frame comprises an IPv4 message and encapsulates the GFP frame with the IPv4 message, if the address length is not set to 20 and a first 4 bits of a header field comprising the network layer data are set to "0100"; and c) the source sets the UPI filed to "00010001" to indicate that the GFP frame comprises an IPv6 message and encapsulates the GFP frame with the IPv6 message, if the address length is not set to 20 and if the first 4 bits of the header field comprising the network layer data are set to "0110";

3) the source performing physical layer processing on the GFP frame where the physical layer processing comprises at least one of SDH, SONET, OTN and PDH physical layer processing;

4) the source sends the physically processed GFP frame to a sink over at least one of an SDH, SONET, OTN and PDH network;

5) the sink receives the GFP frame and performs physical inverse-processing on the received GFP frame where the physical inverse-processing comprises at least one of SDH, SONET, OTN and PDH physical inverse-processing;

6) the sink parses the received GFP frame where parsing the received GFP frame further comprises extracting a UPI field; and 7) the sink determines if the GFP frame comprises at least one of a control message and a network management message based on a value comprising the UPI field.

7. A method for receiving control messages and network management messages where the control messages and network management message are encapsulated in a GFP frame, comprising the following steps:

1) a sink receives data sent from a source where ~ the received data comprises a GFP frame;

2) the sink performs physical layer inverse-processing on the GFP frame;

3) the sink extracts a UPI field from the GFP frame; and 4) the sink identifies a type of message comprising the GFP frame based on the extracted UPI field where the type of message comprising the GFP frame is at least one of an IPv4 message, an IPv6 message and a CLNP message wherein if the extracted UPI is set to 0001111 the GFP frame comprises a CLNP message, if the extracted UPI is set to 00010000 the GFP frame comprises an IPv4 message, and if the extracted UPI is set to 00010001 the GFP frame comprises an IPv6 message.

8. The method according to claim 7, wherein the physical layer inverse-processing comprises at least one of SDH, SONET, OTN and PDH physical layer processing; and where the GFP frame is sent on at least one of an SDH network, a SONET network, an OTN network and a PDH network.

9. The method according to claim 7, wherein the GFP frame comprises at least one of a network management message and a control message where the network management message comprises a CLNP message and the control message comprises at least one of an IPv4 message and an IPv6 message; and wherein the control message is associated with a control message type, the IPv4 message is associated with a IPv4 message type and the IPv6 message is associated with a IPv6 message type.

10. An apparatus comprising a source and sink wherein;

the source is configured to receive network layer data, determine a type" of data of the network layer data, and format a GFP frame;

formatting the GFP frame comprises determining the data type of the network layer data and setting a UPI field to a predetermined value that is mapped to the data type of the network layer data where the UPI field comprises a field of the GFP frame and formatting the GFP frame further comprises encapsulating the GFP frame with at least one of an IPv4 message, IPv6 message and CLNP message, where:

a) if an address length comprising the network layer data is set to 20, the source sets the UPI to 0001111 to indicate the GFP frame comprises a CLNP message and encapsulates the GFP frame with the CLNP message;

b) if the address length is not set to 20 and if a first 4 bits of a header field comprising the received network layer data is set to "0100", the source sets the UPI field to "00010000" to indicate that the GFP frame comprises an IPv4 message and encapsulates the GFP frame with the IPv4 message; and c) if the address length is not set to 20 and a first 4 bits of the header field comprising the received network layer data is set to "0110", the source sets the UPI filed to 00010001 to indicate that the GFP frame comprises an IPv6 message and encapsulates the GFP frame with the IPv6 message;

the source is further configured to perform physical layer processing on the GFP frame where the physical layer processing comprises at least one of SDH, SONET, OTN and PDH physical layer processing;

the source is further configured to send the GFP frame to a sink over at least one of a SDH, SONET, OTN and PDH network;

the sink is configured to receive the GFP frame and perform physical inverse-processing on the received GFP frame where physical inverse-processing comprises at least one of SDH, SONET, OTN and PDH physical inverse-processing;

the sink is configured to parse the received GFP frame where parsing the received GFP frame comprises extracting a UPI field; and the sink is configured to determine if the GFP frame comprises at least one of an IPv4 message, IPv6 message and CLNP message based on a value comprising the UPI field of the received GFP frame.

11. The apparatus of claim 10 wherein the GFP frame comprises a network management message that further comprises a CLNP message; and where the GFP frame comprises a control message where the control message further comprises at least one of an IPv4 and IPv6 message.

12. The apparatus of claim 10 wherein the sink determining if the GFP frame comprises at least one of an IPv4 message, an IPv6 message and a CLNP message further comprises determining a value of the UPI field, if the value of the UPI field is set to "0001111" the received GFP frame comprises a CLNP message, if the value of the UPI field is set to "00010000" the received GFP frame comprises an IPv4 message, and if the value of the UPI is set to "00010001" the received GFP frame comprises an IPv6 message.

* * * * *